United States Statutory Invention Registration [19]

[11] Reg. Number: H935

Rines [43] Published: Jul. 2, 1991

[54] COMPOSITIONS FOR OIL-BASE DRILLING FLUIDS

[75] Inventor: Steven P. Rines, Houston, Tex.

[73] Assignee: M-I Drilling Fluids Company, Houston, Tex.

[21] Appl. No.: 435,072

[22] Filed: Nov. 13, 1989

[51] Int. Cl.[5] ..... C09K 7/06

[52] U.S. Cl. ..... 252/8.511; 252/8.51; 252/8.515

[58] Field of Search ..... 252/8.51, 8.511, 8.515

[56] References Cited

U.S. PATENT DOCUMENTS

| | | | |
|---|---|---|---|
| 2,698,833 | 1/1955 | Wilson | 252/8.51 |
| 3,108,068 | 10/1963 | Weiss et al. | 252/8.51 |
| 3,702,564 | 11/1972 | Chenevert . | |
| 3,989,630 | 11/1976 | Walker | 252/8.51 |
| 4,148,736 | 4/1979 | Meister . | |
| 4,230,586 | 10/1980 | Bretz et al. | 252/8.51 X |
| 4,235,728 | 11/1980 | Schulz et al. . | |
| 4,508,628 | 4/1985 | Walker et al. | 252/8.515 |
| 4,519,923 | 5/1985 | Hori et al. | 252/8.51 X |
| 4,537,688 | 8/1985 | Peiffer et al. . | |
| 4,579,669 | 4/1986 | Walker et al. . | |
| 4,615,813 | 10/1986 | Bretz | 252/8.51 X |
| 4,618,433 | 10/1986 | Allison, III | 252/8.51 X |
| 4,631,136 | 12/1986 | Jones, III | 252/8.515 |
| 4,666,613 | 5/1987 | Schapira et al. | 252/8.511 |
| 4,787,990 | 11/1988 | Boyd | 252/8.515 X |

*Primary Examiner*—Robert L. Stoll
*Assistant Examiner*—Gary L. Geist
*Attorney, Agent, or Firm*—Arnold, White & Durkee

[57] ABSTRACT

An improved oil-base drilling fluid comprising a continuous oil phase and a dispersed internal phase using aqueous non-halide salt solutions is described. Preferably, the non-halide salt is potassium acetate, calcium acetate, sodium proprionate or combinations thereof, however, citrate, tartrate, or gluconate salts may also be used. Emulsifiers, wetting agents, and other chemicals may be added in varying concentrations to achieve desired characteristics for the drilling fluid. The composition has suitable rheological properties, stability, and hole cleaning abilities for use as a drilling fluid; and it is more compatible with environmentally acceptable land disposal methods than conventional oil-base drilling fluids used in land drilling applications.

15 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

COMPOSITIONS FOR OIL-BASE DRILLING FLUIDS

BACKGROUND OF THE INVENTION

The invention relates to an improved oil-base drilling fluid. The improved drilling fluid has the stability, rheological properties, and hole cleaning abilities required for drilling fluid applications; but it is less toxic than known oil-base drilling fluids and exhibits greater environmental compatibility with land disposal methods than current oil-base drilling fluids. More particularly, the improved drilling fluid incorporates novel compounds into the solution used to form the internal water phase. Also, the use of low aromatic content oils for the continuous oil phase in the preferred embodiment further reduces the toxicity and improves the environmental compatibility of the drilling fluid.

Drilling fluids or muds are an important component of petroleum exploration and production. These fluids, which are made with a variety of components, are used to clean drill bits, remove cuttings from holes, and maintain drilling pressure. The rheological properties of a drilling fluid are critical because the fluid must exhibit certain properties to accomplish these tasks and must maintain these properties during continued use at well conditions.

Drilling fluids may be either water-base or oil-base. Typically, water-base drilling fluids are used for drilling operations, but they suffer from disadvantages related to the nature of water as used in drilling applications. Specifically, water migrates from the drilling fluid into surrounding clay or shale formations and causes disintegration or alteration of the clay or shale formation. Further, the water will dissolve salts in the clay or shale formation, interfere with the flow of gas or oil through the formation, and corrode iron in the drilling equipment.

Oil-base drilling fluids, on the other hand, do not affect clay or shale formations or soluble salts in the formations, because oil is native to these formations. Further, oil-base drilling fluids provide several advantages over water-base drilling fluids such as better lubricating qualities, higher boiling points, and lower freezing points. Because oil-base drilling fluids cost more than water-base drilling fluids, they are used in applications where they provide superior performance under particular conditions.

Oil-base drilling fluids typically contain some amount of water. This water may occur in concentrations less than approximately 5 percent as an emulsified contaminant in oil-base drilling fluids. In other oil-base drilling fluids, water is intentionally added along with an effective emulsifier to produce a water-in-oil or invert emulsion. An emulsifier is necessary to prevent over thickening of the drilling fluid which typically occurs when higher concentrations (>5%) of water are used in oil-base drilling fluids. These emulsions use water as a suspending agent for various components of the drilling fluid, and typically contain 10 to 60 percent water.

Oil-base invert-emulsion drilling fluids include two phases: (1) A continuous phase containing oil (typically No. 2 Diesel Fuel), surfactants, and wetting agents; and (2) a dispersed internal water phase which is often a water-based solution of calcium chloride.

The water in the internal phase of an invert emulsion drilling fluid may act just as the water in a water-based drilling fluid and migrate into surrounding clay or shale formations with negative effects on the formation. This migration is primarily due to the thermodynamic properties of the water. For example, the thermodynamic activity of a pure water internal phase in a drilling fluid is higher than the thermodynamic activity of water in clay or shale formations which contain dissolved salts. Consequently, there is a tendency for the thermodynamic activities of the water in the drilling fluid and the water in the clay or shale formation to equilibrate. This occurs by the transfer of pure water into the clay or shale formation and the associated transfer of dissolved salts into the pure water of the drilling fluid. The transfer of water from the drilling fluid to the clay or shale formation may cause the formation to swell and crack.

The thermodynamic tendency of the water in a drilling fluid to migrate into the surrounding formation can be measured as a vapor pressure, and is commonly referred to as the water activity. The water activity is referenced as the tendency that the solution will migrate relative to pure water under the same conditions. Solutions, especially chloride solutions, are used in the internal phase in known oil-base drilling fluids to minimize the water activity of the internal phase. Solutions are used instead of pure water to decrease the migration of water from the drilling fluid into surrounding formations because the dissolved salt decreases the water activity. Chloride salts such as calcium chloride are often used in known drilling fluids as the dissolved salt in the internal phase for the purpose of controlling the water activity of the internal phase.

It should be appreciated that by accurately measuring the water activity of the water in surrounding formations, the water activity of the internal phase in an invert emulsion drilling fluid may be adjusted by the proper addition of salt to match the water activity in the surrounding formation. This prevents the transfer of water between the drilling fluid and the surrounding formation, and avoids adverse effects on the surrounding formation. Generally, sufficient calcium chloride is added to balance the lowest water activity of surrounding formations and the emulsified water of the drilling fluid.

Unfortunately, calcium chloride solutions and other halide salt solutions are toxic to life, especially plant life. Problems associated with environmental contamination and oil-base drilling fluid disposal are well documented. (See, for example, George R. Gray and H. C. H. Darley, *Composition and Properties of Oil Well Drilling Fluids*, Fourth Edition, Gulf Publishing Company at page 585). Concern has been expressed by environmentalists and others with the possibility of polluting underground water supplies, damaging soil productivity and diminishing surface water quality. In a conference sponsored by the Environmental Protection Agency in May of 1975 in Houston, Tex., the effects of both techniques and chemicals used in drilling fluids and their impact on the environment were discussed. The outlook for landfill disposal of oil-base drilling fluids was not good. Such muds were thought to be toxic and the effects long-term. The toxic effect of oil-base muds on the soil was thought to be inherent in the chemicals used. Thus, known oil-base drilling fluids using a calcium chloride internal phase have adverse environmental consequences when used for land drilling operations.

Preferably, land farming could be used to dispose of both drilling fluids and the cuttings produced at a land drilling operation. And, the land farm would ideally be located near the site of the drilling operation. It should be appreciated that the cuttings contain an amount of drilling fluids. In land farming, the spent drilling fluids and cuttings would be spread over a section of land and plowed into the ground using standard agricultural methods. Drilling fluids using chloride solutions in their internal phases have proven too toxic to be acceptably disposed of by land farming, however.

Environmental regulations also restrict the concentration of halides, nitrates, sulfates, and phosphates in drilling fluids used for land drilling operations. Thus, there is a need for oil-base drilling fluids having a composition that will comply with environmental regulations and will be environmentally compatible with land disposal methods.

Known drilling fluid compositions have used acetate salts in low concentrations for various purposes. For example, U.S. Pat. No. 4,148,736 discloses the use of sodium acetate as a buffer salt in a water-chloroform drilling fluid for specialty applications such as tertiary oil recovery. Col. 3, lines 57–61. Similarly, U.S. Pat. No. 4,537,688 discloses the use of sodium acetate to buffer a polymerization reaction in a sulfonated terpolymer ionomer viscosification agent for drilling fluids. Col. 5, lines 64–67.

While the use of acetic acid has been noted as a vapor pressure depressant for the water phase of invert emulsion drilling fluids, U.S. Pat. No. 3,702,564, Col. 13, lines 58–62, its beneficial effect on the toxicity of invert emulsion drilling fluids was not noted. It should be appreciated that the addition of any water soluble material to a water solution will decrease the vapor pressure and water activity of the solution.

SUMMARY OF THE INVENTION

The invention relates to an improved oil-base drilling fluid having enhanced environmental compatibility with land disposal methods and comprising a continuous oil phase and a dispersed internal water phase which uses non-halide compounds to control the water activity of the drilling fluid and minimize the environmental impact of the drilling fluid. These salts of organic acids have been identified as being particularly useful. These compounds are calcium acetate ($Ca(OAc)_2$), potassium acetate (KOAc), and sodium proprionate ($NaO_2C_2H_3$). Each compound has specific advantages, and mixtures of these salts are normally recommended. Additionally, a low aromatic content oil may be used for the continuous oil phase to further minimize the environmental impact of the drilling fluid. An effective amount of an emulsifying agent is included to ensure proper dispersal of the internal water phase in the continuous oil phase. Surfactants, wetting agents, and other additives may also be included to vary the fluid's rheology, HTHP (high temperature, high pressure) fluid loss, and other properties.

The surprising results of applicant's unique oil-base drilling fluid have resurrected the possibility that oil-base drilling fluids might be environmentally compatible with disposal in landfills and by land farming. The compositions of the invention have lower toxicities than known oil-base drilling fluids due to the use of acetates, proprionates or other non-halide salts to control the water activity of the internal phase. The toxicity of the composition can be further reduced by using a low aromatic content oil for the continuous oil phase. The use of the compositions of the invention enables the drilling fluid and cuttings from a well to be disposed of in an acceptable environmental manner.

DESCRIPTION OF THE INVENTION

Essentially, the compositions of the invention comprise an invert-emulsion, oil-base, drilling fluid made from a continuous oil phase and a dispersed internal phase that can be used for land drilling operations in a manner environmentally compatible with land disposal methods. For purposes of this application, the phrase "environmentally compatible with land disposal methods" will be understood to refer to the chemical characteristics of applicant's unique muds that permit their disposal in landfills and land farms without long-term toxicity to soil productivity or similar adverse characteristics.

The dispersed internal phase is made with novel solutions that have reduced toxicity as compared to known internal phases in drilling fluids. The preferred method for the novel solution formulation is to use a mixture of calcium acetate with either sodium proprionate or potassium acetate. The calcium acetate lends emulsion stability and is used from 4–10% by weight. The other salts are used for further adjustment of the internal phase activity. The potassium acetate concentration in the solution can range from 3% by weight to the saturation concentration of potassium acetate. A potassium acetate solution is saturated at 69 wt. % under normal conditions. The sodium proprionate is used for concentrations of up to 28% by wt. Although sodium propionate is not as soluble as potassium acetate, and solutions saturate approximately 28% by weight, its use is preferred in solutions needing an activity from 1.00 to 0.58 because of better environmental compatibility and better economics. When activities of below 0.58 are needed or when an inhibitive $K^+$ ion would give added stability, KOAc is the salt used with $Ca(OAc)_2$ in the internal phase. These salts serve as a substitute for the calcium chloride in known solutions used for invert emulsions. Other acetate salts can be used such as sodium acetate. Further, other compounds such as the citrate, tartrate, gluconate, and propionate salts of alkali metals may be used.

Preferably, a low aromatic content mineral oil, such as Exxon's Escaid 90 product ($<0.5$ wt. % aromatic), is used for the continuous oil phase. Other low aromatic oils can also be used such as Exxon's Escaid 110, Conoco's LVT 200, and Shell's Shellsol DMA. Generally, any low aromatic content mineral oil will improve the environmental compatibility of the drilling fluid for land disposal methods. It should be appreciated that conventional mineral and diesel oils may also be used with the compositions of the invention, but they will not achieve as favorable environmental compatibility as is achieved with low aromatic content mineral oil. The oil-phase/water-phase ratio of the drilling fluid can vary from 20:1 to 1:2 by volume.

A known emulsifier is added in an effective amount to ensure the dispersal of the internal water phase in the continuous oil phase. For example, M-I Drilling Fluids' VersaMul can be used as an emulsifier. Other commercially available emulsifiers known in the art may also be used.

Other additives known in the art can be included as necessary to modify the characteristics of the drilling fluid. For example, the following additives may be included to achieve particular characteristics:

| Additive | Example |
|---|---|
| Emulsifying Agent | VersaCoat |
| Wetting Agent | VersaWet |
| Wetting Agent | VersaSWA |
| Gelling Agent | VG-69, VersaGel |
| Viscosifying Agent | VersaHRP |
| Viscosifying Agent | VersaMod |
| Weighting Agent | Barite |
| Neutralizing Agent | Lime |

These additives are used as necessary over a range of concentrations. Other commercially available additives can also be used to modify the rheology and other properties of the drilling fluid. The stability of the improved compositions over a wide range of formulations affords great flexibility in tailoring their properties to specific drilling applications.

Preparation of the compositions of the invention requires some care. Particularly, the addition of the internal phase acetate solution may destabilize the invert emulsion. This can be avoided by adding the emulsifier and other liquid agents which modify the fluid's rheology to the oil before adding the internal phase. Initially, the invert emulsion will be thinner than expected. The application of shear, typically two circulations through a drill bit, will cause the drilling fluid to thicken to an appropriate viscosity and stabilize.

Rheology and Stability

The fluid properties of the improved compositions have been measured for a range of formulations. See Examples 1 and 2, and Tables 1 and 2. The data indicates that the compositions have rheological properties and stabilities acceptable for use as oil-base drilling fluids. The invert emulsion formed by the oil and acetate solution is stable over a wide range of potassium acetate concentrations (3 wt % to 69 wt %). Moreover, the rheology can be easily modified by the addition of gelling or thickening agents such as VersaMul or VG-69 to increase viscosity and lower the HTHP fluid loss, or the addition of a emulsifying agent such as VersaCoat to lower the viscosity. One advantage of this system is its stability in high solution concentrations.

The effects of commonly encountered drilling contaminants on the rheology and other properties of the improved composition were measured. See Example 3, Table 3. Only modest rheological changes were observed for exposure to drill solids, anhydrite ($CaSO_4$), sodium chloride (NaCl), and Class H wet cement in high concentrations. Thus, the improved compositions retain their desired fluid properties upon exposure to contaminants commonly encountered in drilling.

The rheological properties of one composition of the invention were measured as a function of exposure to cold temperatures. See Example 4, Table 4. This experiment, which represents worst case conditions due to a high water activity in the internal phase, a high concentration of barite and drill solids, and exposure to —32° F. for 48 hours, indicates there was little change in the rheological properties due to cold temperatures.

Water Activity

The water activity of the internal phase made with a potassium acetate solution can be varied from 1.0 (pure water) to 0.225 (saturated potassium acetate solution). Thus the range of water activities attainable with this system is even greater than that for calcium chloride, which has an activity of 0.295 at saturation. Most calcium chloride solutions are used at a water activity near 0.75 (~25 wt. % calcium chloride). This same activity can be achieved with a potassium acetate concentration of 23% by weight. Use of sodium propionate will restrict the range of water activity from 1.00–0.520, at saturation common salt effect of calcium acetate mixtures seem to give little change in overall activity or solubility when calcium acetate is 10% by wt. or less.

Environmental Impact

Referring to Examples 1, 4, and 5, the environmental impact of the improved compositions were measured using a Microtox analysis. This method measures the effect of a water soluble extract from a drilling fluid composition on the emission of fluorescent light from bioluminescent marine bacteria. Results are reported as an "EC-50", or effective concentration of water soluble extract which causes a 50% reduction in light transmitted by the bacteria. The higher the EC-50, the less toxic the composition.

The toxicity of an invert emulsion drilling fluid is dependent on the oil, additives, and internal phase solution that are used as components. Oil has a significant effect on toxicity. Tests on neat oil samples show three "levels" of toxicity. In a procedure involving extraction into deionized water for two hours, EC-50's of 2.4–3.6 are observed for diesel oils, 7.3–13.9 for conventional mineral oils (~4–5% aromatic), and 80.0–115.6 for low aromatic mineral oils (Escaid 90 and 110, <0.5 wt % aromatic). It appears that toxicity of aromatic hydrocarbons is greater than toxicity for non-aromatic hydrocarbons such as aliphatic hydrocarbons because oil solubility in water generally increases with the aromatic content of the oil. Consequently, the tendency of a high aromatic content oil to leach into a water phase whose toxicity is measured by a Microtox analysis is greater.

The internal water phase in an invert emulsion drilling fluid can affect toxicity in two ways. First, an increase in the salt concentration of the water phase decreases toxicity by decreasing the water activity with a subsequent decrease in the water soluble toxins leached from the oil phase. Thus, an improved EC-50 is observed in a typical drilling fluid when the potassium acetate concentration is increased from 4% to 19.5% by weight.

The salt dissolved in the internal water phase also contributes to toxicity. For example, the EC-50 for a 29 wt % potassium acetate solution is twice as good as that of a 25 wt % calcium chloride solution (same water activity); that is, its toxicity is half that of the calcium-chloride solution. Generally, the use of a potassium acetate internal phase improves the EC-50 of a drilling fluid as compared to the same drilling fluid made with a calcium chloride internal phase regardless of the oil used. See Example 5, Table 5. Thus, the compositions of the invention are a major improvement over conventional invert emulsion drilling fluids.

Additives which associate with and stabilize the oil phase appear to decrease toxicity by decreasing leeching into the aqueous phase. Likewise, additives which decrease HTHP fluid loss will decrease toxicity. However, a "saturation" effect in which no additional effect on HTHP fluid loss is measured can be observed with these additives. Additional additives beyond this point may increase toxicity if the additives themselves are leeching into the aqueous phase and contributing to the toxicity.

Oil retention on simulated cuttings has been measured by retort analysis for a range of oil-phase/water-phase ratios and acetate concentrations. See Example 1, Table 1. Low oil retention facilitates the disposal of these cuttings by landfill or land farm methods. Cutting oil retentions as low as 7.7 wt. % have been observed with the compositions of the invention. Oil-base drilling fluids with a high water content generally yield greatly reduced oil retention on the cuttings.

EXAMPLES

Preparation of Samples

The appropriate amount of base oil was weighed out. The predetermined amount of liquid ingredients (i.e. VersaMul, VersaCoat, VersaWet) were then weighed into the oil and sheared for 10–15 minutes. Next, VersaGel was added, and the mixture was sheared for an additional 15 minutes. Lime was then added and the mixture was sheared for an additional 10 minutes. The solution of the internal phase was added while stirring, and the mixture was sheared for 20 minutes at the highest possible shear rate (7000–8000 rpm). Drill solids, a mixture of 50:50 bentonite and Rev Dust, were then added, and the mixture was sheared for an additional 15 minutes. Finally, VersaMod was added, and the mixture was sheared for an additional 30 minutes.

EXAMPLE 1

Twelve formulations of various compositions were prepared using the procedure described above. All samples were aged at 150° F. for 16 hours. Approximately 15 ppb of lime and 50 ppb of drill solids were added to each formulation.

One barrel equivalent of each sample formulation was treated with 35 grams of cuttings of a size that would pass through a 12 mesh screen but be retained on a 20 mesh screen. The fluid and cuttings were hot rolled for one hour at 150° F., and the fluid was filtered over a 40 mesh screen for 2 minutes using medium agitation. The cuttings were weighed into a retort and the oil distilled from the solid. The oil retention values were calculated from the weight difference. Likewise, a Microtox EC-50 is reported for each formulation.

Rheological properties at a variety of conditions along with other fluid properties are reported. Referring to Table 1, the numbers corresponding to 600 rpm, 300 rpm, etc. represent the Fann® rotational viscometer readings at those rpm settings. Plastic viscosity is the difference between the 600 rpm and 300 rpm readings from the Fann® rotational viscometer. Yield point is the difference between the 300 rpm reading and the plastics viscosity. The 0s, 10s, and 10m Gel represent the Fann® viscometer reading at 3 rpm after 0 seconds, 10 seconds, and 10 minutes. HTHP fluid losses were corrected for area and at 175° F. and 500 psi differential pressure. These rheological properties are likewise reported in Tables 2, 3, 4, and the tables of the appendix.

TABLE 1

| Sample No. | 1 | 2 | 3 | 4 | 5 | 6 |
|---|---|---|---|---|---|---|
| FORMULATION | | | | | | |
| Salt ($KO_2C_2H_5$) | | | | | | |
| Concentration in Brine (wt %) | 3.00 | 3.00 | 3.00 | 3.00 | 3.00 | 3.00 |
| Oil, Escaid 90 (bbl eq) | 0.73 | 0.73 | 0.73 | 0.73 | 0.73 | 0.73 |
| Brine (bbl eq) | 0.19 | 0.19 | 0.19 | 0.19 | 0.19 | 0.19 |
| VersaMul (ppb) | 1.02 | 1.02 | 7.04 | 1.02 | 1.02 | 1.02 |
| Versa Coat (ppb) | 1.54 | 7.58 | 1.54 | 1.54 | 1.54 | 1.54 |
| VersaWet (ppb) | — | — | — | 6.21 | — | — |
| VersaHRP (ppb) | — | — | — | — | — | 4.15 |
| VersaMod (ppb) | — | — | — | — | 3.95 | — |
| VG-69 (ppb) | 6.00 | 6.00 | 6.00 | 6.00 | 6.00 | 6.00 |
| RHEOLOGICAL PROPERTIES (at 115° F.) | | | | | | |
| 600 RPM | 23 | 20 | 14 | 11 | 28 | 38 |
| 300 RPM | 14 | 11 | 8 | 6 | 18 | 26 |
| 200 RPM | 11 | 8 | 6 | 4 | 14 | 23 |
| 100 RPM | 8 | 5 | 4 | 4 | 11 | 18 |
| 6 RPM | 4 | 2 | 2 | 1 | 8 | 17 |
| 3 RPM | 4 | 2 | 2 | 1 | 9 | 20 |
| Plastic Viscosity (cps) | 9 | 9 | 6 | 5 | 10 | 12 |
| Yield Point (lbs/100 $ft^2$) | 5 | 2 | 2 | 1 | 8 | 14 |
| 0 s Gel (lbs/100 $ft^2$) | 4 | 1 | 2 | 1 | 8 | 16 |
| 10 s Gel (lbs/100 $ft^2$) | 6 | 2 | 3 | 1 | 17 | 17 |
| 10 m Gel (lbs/100 $ft^2$) | 12 | 4 | 4 | 1 | 24 | 20 |
| OTHER PROPERTIES | | | | | | |
| HTHP (ml/30 min) | 33.4 | 15.6 | 6.8 | 49.4 | 12.4 | 33.8 |
| Electric Stability (volts) | 500 | 595 | 340 | 300 | 525 | 740 |
| Pom (mL 0.10N $H_2SO_4$) | 6.45 | 2.95 | 3.05 | 5.10 | 2.05 | 3.65 |
| Microtox EC-50 | 1.25 | 8.30 | 7.25 | 8.25 | 3.05 | 2.90 |
| Oil Retention on Cutting (wt %) | 18.34 | 16.98 | 13.06 | 13.91 | 18.32 | 20.70 |

| Sample No. | 7 | 8 | 9 | 10 | 11 | 12 |
|---|---|---|---|---|---|---|
| FORMULATION | | | | | | |
| Salt ($KO_2C_2H_5$) | | | | | | |
| Concentration in Brine (wt %) | 3.0 | 26.0 | 68.7 | 3.0 | 26.0 | 68.7 |
| Oil, Escaid 90 (bbl eq) | 0.73 | 0.73 | 0.73 | 0.73 | 0.73 | 0.73 |
| Brine (bbl eq) | 0.21 | 0.21 | 0.21 | 0.21 | 0.21 | 0.21 |
| VersaMul (ppb) | 3.50 | 3.50 | 3.50 | 5.74 | 5.74 | 5.74 |
| VersaCoat (ppb) | 1.50 | 1.50 | 1.50 | 2.00 | 2.00 | 2.00 |

TABLE 1-continued

| | | | | | | |
|---|---|---|---|---|---|---|
| VG-69 (ppb) | 6.00 | 6.00 | 6.00 | 4.00 | 4.00 | 4.00 |
| RHEOLOGICAL PROPERTIES (at 115° F.) | | | | | | |
| 600 RPM | 18 | 13 | 13 | 56 | 52 | 66 |
| 300 RPM | 11 | 7 | 8 | 33 | 30 | 38 |
| 200 RPM | 8 | 5 | 7 | 24 | 23 | 29 |
| 100 RPM | 6 | 3 | 4 | 14 | 14 | 18 |
| 6 RPM | 3 | 2 | 2 | 3 | 3 | 8 |
| 3 RPM | 3 | 2 | 2 | 2 | 3 | 8 |
| Plastic Viscosity (cps) | 9 | 6 | 5 | 23 | 22 | 28 |
| Yield Point (lbs/100 $ft^2$) | 2 | 1 | 3 | 10 | 8 | 10 |
| 0 s Gel (lbs/100 $ft^2$) | 3 | 2 | 3 | 3 | 3 | 7 |
| 10 s Gel (lbs/100 $ft^2$) | 5 | 4 | 4 | 4 | 4 | 16 |
| 10 m Gel (lbs/100 $ft^2$) | 7 | 5 | 7 | 6 | 6 | 16 |
| OTHER PROPERTIES | | | | | | |
| HTHP (ml/30 min) | 19.2 | 4.4 | 96.4 | 2.2 | 1.6 | 10.8 |
| Water within filtrate | — | — | 11.8 | — | — | 3.6 |
| Electric Stability (volts) | 510 | 445 | 375 | 300 | 290 | 125 |
| Pom (mL 0.10N $H_2SO_4$) | 5.45 | 5.25 | 4.55 | 2.10 | 3.75 | 4.15 |
| Microtox EC-50 | 5.00 | 2.50 | 3.40 | 3.90 | 3.75 | 2.70 |
| Oil Retention on Cuttings (wt %) | 14.68 | 17.68* | 18.70 | 10.54 | 7.70 | 12.68* |

*denotes sample where percent error in collection of distillate was greater than 5.0%.

EXAMPLE 2

Eighteen compositions using different salts in the internal phase were prepared according to the procedure described above. Each composition had a density of 10 ppg and an oil-phase/water-phase ratio of 4/1. The base oil for each formulation was Escaid 90. The base formulation of each composition was:

| | |
|---|---|
| VersaCoat | 3.0 ppb |
| VersaMul | 5.0 ppb |
| VersaMod | 1.5 ppb |
| VG-69 | 6.0 ppb |
| Lime | 15.0 ppb |
| Drill Solids | 55.0 ppb |

The samples were heat aged for 16 hours at 180° F.

The rheological properties, other fluid properties and Microtox EC-50 analysis for each composition are reported in Table 2.

TABLE 2

| Sample No. | 1 | 2 | 3 | 4 | 5 | 6 |
|---|---|---|---|---|---|---|
| Salt | NaSCN | $K_2CO_3$ | KSCN | Na(OPr)[1] | K(Tar)[2] | NaO(Ac)[3] |
| wt % | 29.4% | 28.5% | 30.0% | 29.5% | 30.0% | 30.0% |
| Oil (bbl eq) | 0.67 | 0.69 | 0.67 | 0.67 | 0.68 | 0.66 |
| Brine (bbl eq) | 0.21 | 0.19 | 0.21 | 0.21 | 0.20 | 0.21 |
| Barite (ppb) | 97.81 | 90.60 | 97.71 | 98.74 | 94.50 | 102.18 |
| RHEOLOGICAL PROPERTIES (at 150° F.) | | | | | | |
| 600 RPM | 16 | 44 | 14 | 29 | 20 | 29 |
| 300 RPM | 9 | 30 | 9 | 19 | 11 | 17 |
| 200 RPM | 7 | 24 | 7 | 15 | 18 | 12 |
| 100 RPM | 4 | 18 | 4 | 11 | 5 | 8 |
| 6 RPM | 2 | 10 | 3 | 7 | 3 | 5 |
| 3 RPM | 1 | 10 | 2 | 7 | 2 | 4 |
| Plas Vis | 7 | 14 | 5 | 10 | 9 | 12 |
| Yield Point | 2 | 16 | 4 | 9 | 2 | 5 |
| 0 s Gel | 2 | 8 | 2 | 7 | 2 | 4 |
| 10 s Gel | 2 | 10 | 3 | 10 | 3 | 7 |
| 10 m Gel | 4 | 20 | 3 | 13 | 4 | 10 |
| OTHER PROPERTIES | | | | | | |
| Elec Stab | 275 | 002 | 510 | 715 | 135 | 595 |
| HTHP | 5.8 | N/C | 7.8 | 12.2 | 60.8 | 9.0 |
| Pom | 2.15 | 5.10 | 2.70 | 2.60 | 5.25 | 2.85 |
| $Cl^-$ | 3400 | 100 | 2600 | 50 | 100 | 50 |
| Microtox EC-50 | 0.65 | 5.95 | 9.65 | 3.35 | 3.45 | 11.0 |

| Sample No. | 7 | 8 | 9 | 10 | 11 | 12 |
|---|---|---|---|---|---|---|
| Salt | $NaS_2O_3$ | $Na_3(Cit)$[4] | NaO(OCPh)[5] | $Na_2CO_3$ | NaK(Tar)[6] | Na(Glu)[7] |
| wt % | 34.9 | 41.9 | 35.0 | 15.0 | 54.8 | 46.1 |
| Oil (bbl eq) | 0.694 | 0.679 | 0.664 | 0.709 | 0.650 | 0.664 |
| Brine (bbl eq) | 0.188 | 0.201 | 0.210 | 0.164 | 0.233 | 0.215 |
| Barite (ppb) | 85.66 | 89.30 | 98.57 | 99.09 | 84.57 | 89.33 |
| RHEOLOGICAL PROPERTIES (@ 150° F.) | | | | | | |
| 600 RPM | 17 | 76 | 17 | 37 | 26 | 20 |
| 300 RPM | 9 | 49 | 9 | 21 | 14 | 12 |
| 200 RPM | 7 | 40 | 8 | 16 | 8 | 8 |
| 100 RPM | 5 | 32 | 4 | 12 | 5 | 4 |
| 6 RPM | 3 | 30 | 2 | 9 | 2 | 2 |
| 3 RPM | 2 | 31 | 1 | 7 | 1 | 1 |

TABLE 2-continued

| | | | | | | |
|---|---|---|---|---|---|---|
| Plas Vis | 8 | 27 | 8 | 16 | 12 | 8 |
| Yield Point | 1 | 22 | 1 | 5 | 2 | 4 |
| 0 s Gel | 2 | 25 | 0 | 5 | 0 | 0 |
| 10 s Gel | 2 | 28 | 1 | 7 | 1 | 2 |
| 10 m Gel | 3 | 32 | 2 | 12 | 2 | 4 |
| OTHER PROPERTIES | | | | | | |
| Elec Stab | 295 | 002 | 340 | 125 | 135 | 190 |
| HTHP | 16.8 | N/C | 25.2 | N/C | N/C | 52.8 |
| Pom | 2.45 | 3.05 | 4.75 | 3.85 | 4.85 | 4.90 |
| Cl⁻ | 3.050 | 150 | 50 | 100 | 100 | 50 |
| Microtox | 4.90 | 2.50 | 1.10 | 0.10 | 2.95 | 1.25 |
| Sample No. | 13 | 14 | 15 | 16 | 17 | 18 |
| Salt | $Ca(OAc)_2$[8] | K(Glu)[9] | $K_2C_2O_4$ | $Na_2SO_3$ | $Ca(OPr)_2$[10] | $K_3(Cit)$[11] |
| wt % | 25.8 | 50.9 | 22.8 | 27.1 | 28.5 | 27.4 |
| Oil (bbl eq) | 0.678 | 0.656 | 0.693 | 0.696 | 0.671 | 0.686 |
| Brine (bbl eq) | 0.193 | 0.225 | 0.181 | 0.179 | 0.200 | 0.188 |
| Barite (ppb) | 101.50 | 86.89 | 98.03 | 95.40 | 101.61 | 98.29 |
| RHEOLOGICAL PROPERTIES (at 150° F.) | | | | | | |
| 600 RPM | 47 | 22 | 10 | 63 | 67 | 33 |
| 300 RPM | 30 | 13 | 5 | 41 | 39 | 20 |
| 200 RPM | 24 | 9 | 4 | 33 | 33 | 18 |
| 100 RPM | 18 | 6 | 2 | 26 | 34 | 12 |
| 6 RPM | 11 | 3 | 1 | 30 | 35 | 4 |
| 3 RPM | 11 | 2 | 1 | 36 | 35 | 3 |
| Plas Vis | 17 | 9 | 5 | 22 | 28 | — |
| Yield Point | 13 | 4 | 0 | 19 | 11 | — |
| 0 s Gel | 9 | 2 | 0 | 23 | 33 | 2 |
| 10 m Gel | 18 | 3 | 0 | 25 | 35 | 4 |
| 10 m Gel | 42 | 5 | 1 | 28 | 67 | 7 |
| OTHER PROPERTIES | | | | | | |
| Elec Stab | 1080 | 135 | 002 | 105 | 1010 | 002 |
| HTHP | 9.2 | 84.0 | N/C | N/C | 66.4 | 181.6 |
| Pom | 2.95 | 3.80 | 3.85 | 3.00 | 3.35 | 4.40 |
| Cl⁻ | 100 | 50 | 50 | 700 | 50 | 150 |
| Microtox | 9.15 | 1.50 | 0.685 | 1.90 | 1.75 | 5.50 |

1. Proprionate
2. Tartrate
3. Acetate
4. citrate
5. Benzoate
6. Tartrate
7. Gluconate
8. Acetate
9. Gluconate
10. Propionate
11. Citrate

EXAMPLE 3

Six samples were prepared with the following contaminants: drill solids (18.6 and 37.3 ppb), anhydrite ($CaSO_4$) (18.6 ppb), salt (NaCl) (18.6 and 55.9 ppb), and Class H wet cement (8% by volume). Only modest rheological changes were observed after aging for 3 hours at 150° F. In the worst case (NaCl at 55.9 ppb), 10 second/10 minute gel strengths increased from 12/13 to 26/14 (lbs/100 ft²), HTHP (at 176° F.) increased from 9.6 to 11.6 mL/30 minutes, and the electrical stability decreased form 525 to 470 volts. These results are reported in Table 3.

TABLE 3

CONTAMINATION STUDIES

| CONTAMINANT: | Drill Solids | | | | $CaSo_4$ | | NaCl | | | | Class H Wet Cement | |
|---|---|---|---|---|---|---|---|---|---|---|---|---|
| Amount (ppb) | 18.6 | | 37.3 | | 18.6[4] | | 18.6 | | 55.9 | | 8.0% Vol. | |
| Temperature °F. | 115 | 150 | 115 | 150 | 115 | 150 | 115 | 150 | 115 | 150 | 115 | 150 |
| RHEOLOGICAL PROPERTIES | | | | | | | | | | | | |
| 600 RPM | 20 | 17 | 23 | 19 | 20 | 17 | 17 | 14 | 17 | 14 | 25 | 22 |
| 300 RPM | 13 | 11 | 15 | 13 | 13 | 11 | 10 | 9 | 10 | 9 | 15 | 15 |
| 200 RPM | 11 | 9 | 12 | 12 | 10 | 9 | 8 | 8 | 8 | 8 | 12 | 12 |
| 100 RPM | 8 | 7 | 10 | 9 | 7 | 7 | 7 | 6 | 7 | 7 | 9 | 9 |
| 6 RPM | 7 | 7 | 8 | 8 | 6 | 6 | 4 | 6 | 5 | 6 | 7 | 9 |
| 3 RPM | 7 | 7 | 8 | 8 | 6 | 6 | 4 | 6 | 5 | 6 | 7 | 9 |
| Plastic Viscosity (cps) | 7 | 6 | 8 | 6 | 7 | 6 | 7 | 5 | 7 | 5 | 10 | 7 |
| Yield Point (lbs/100 ft²) | 6 | 5 | 7 | 7 | 6 | 5 | 3 | 4 | 3 | 4 | 5 | 8 |
| 0 s Gel (lbs/100 ft²) | 6 | 7 | 8 | 8 | 6 | 6 | 4 | 6 | 5 | 6 | 7 | 9 |
| 10 s Gel (lbs/100 ft) | 10 | 8 | 11 | 10 | 9 | 7 | 10 | 10 | 12 | 13 | 13 | 11 |
| 10 m Gel (lbs/100 ft²) | 11 | 8 | 12 | 10 | 9 | 8 | 12 | 10 | 26 | 14 | 20 | 11 |
| OTHER PROPERTIES | | | | | | | | | | | | |
| HTHP (mL/30 min)(at 176° F.) | 12.0 | | 13.2 | | 9.2 | | 11.0 | | 11.6 | | 11.8 | |
| Electric Stability (volts) | 580 | | 490 | | 525 | | 560 | | 470 | | 540 | |

TABLE 3-continued

CONTAMINATION STUDIES

| CONTAMINANT: | Drill Solids | | | | $CaSo_4$ | | NaCl | | | | Class H Wet Cement | |
|---|---|---|---|---|---|---|---|---|---|---|---|---|
| Amount (ppb) | 18.6 | | 37.3 | | 18.6[4] | | 18.6 | | 55.9 | | 8.0% Vol. | |
| Temperature °F. | 115 | 150 | 115 | 150 | 115 | 150 | 115 | 150 | 115 | 150 | 115 | 150 |
| Pom (mL 0.10N $H_2SO_4$) | 1.90 | | 1.85 | | 2.00 | | 1.75 | | 1.90 | | 3.20 | |

In the above tests, no adjustment was made for density or volume increase of the fluid.

EXAMPLE 4

A composition was prepared in the manner described above with the following formulation:

| | |
|---|---|
| Escaid 90 Oil (bbl eq) | 0.667 |
| Potassium Acetate Solution 3% at (bbl eq) | 0.170 |
| VersaMul (ppb) | 3.50 |
| VersaCoat (ppb) | 1.00 |
| VG-69 (ppb) | 6.00 |
| VersaMod (ppb) | 2.00 |
| Lime (ppb) | 15.00 |
| Drill Solids (ppb) | 50.00 |
| M-I Barrite (ppb) | 122.11 |
| Final Mud Weight | 10.47 ppg |
| Solids (% vol) | LGS: 8.13<br>HGS: 8.13 |

The composition was aged at 150° F. for 42 hours, and then tested as progressively lower temperatures, until the rheological properties were not measurable. The fluid was then warmed to 115° F. and measured again. The results of the experiment are reported in Table 4.

TABLE 4

Effect of Low Temperatures

| Temperature (°F.) | 115 | 72 | 55 | 29 | 0 | 115 |
|---|---|---|---|---|---|---|
| RHEOLOGICAL PROPERTIES | | | | | | |
| 600 RPM | 33 | 42 | 57 | 92 | * | 36 |
| 300 RPM | 20 | 25 | 32 | 54 | * | 23 |
| 200 RPM | 16 | 19 | 22 | 37 | * | 18 |
| 100 RPM | 11 | 12 | 13 | 22 | | 13 |
| 6 RPM | 6 | 5 | 5 | 5 | 8 | |
| 3 RPM | 3 | 4 | 4 | 4 | 7 | |
| Plastic Viscosity (cps) | 13 | 17 | 25 | 36 | * | 13 |
| Yield Point (lbs/100 $ft^2$) | 7 | 8 | 7 | 18 | * | 10 |
| 0 s Gel (lbs/100 $ft^2$) | 6 | 7 | 4 | 6 | | 12 |
| 10 s Gel (lbs/100 $ft^2$) | 20 | 18 | 7 | 17 | | 23 |
| 10 m Gel (lbs/100 $ft^2$) | 19 | 31 | 31 | 36 | | 29 |
| OTHER PROPERTIES | | | | | | |

TABLE 4-continued

Effect of Low Temperatures

| Temperature (°F.) | 115 | 72 | 55 | 29 | 0 | 115 |
|---|---|---|---|---|---|---|
| Electric Stability (volts) | 740 | — | — | — | — | 975 |

*Too thick to measure. At this temperature the fluid behaved as a thick putty.

EXAMPLE 5

Ten different fluids were prepared according to the procedure described above using four different mineral oils and a diesel oil for the continuous phase and two solutions made with different salts for the internal phase: a 25 wt % calcium chloride ($CaCl_2$) solution and a 29 wt % potassium acetate ($KO_2C_2H_5$) solution. The concentration of additives, the oil/water ratio, and the mud weight were all held constant. The component concentrations of the water soluble fraction were determined by atomic absorption. The results of these studies are reported in Table 5.

The formulations in the examples described above are illustrative of the invention, and other variations and modifications may be made without departing from the scope of the invention. The details described above are to be interpreted as explanatory and not in a limiting sense.

TABLE 5

| Oil | Salt | EC-50 | % Extracted | mg/l K | mg/l Ca |
|---|---|---|---|---|---|
| Escaid 110 | potassium acetate | 8.9 | 25.0 | 3660 | — |
| Diesel | potassium acetate | 3.6 | 25.0 | 3660 | — |
| Escaid 90 | potassium acetate | 10.3 | 24.5 | 3590 | — |
| Shell Sol DMA | potassium acetate | 8.9 | 23.5 | 3440 | — |
| LVT 200 | potassium acetate | 13.9 | 17.7 | 2590 | — |
| Escaid 110 | calcium chloride | 3.3 | 21.2 | — | 2620 |
| Diesel | calcium chloride | 1.7 | 18.1 | — | 2260 |
| Escaid 90 | calcium chloride | 5.1 | 21.6 | — | 2670 |
| Shell Sol DMA | calcium chloride | 2.1 | 21.3 | — | 2630 |
| LVT-200 | calcium chloride | 7.3 | 19.8 | — | 2450 |

EXAMPLE 6

Seed Germination Tests

Drilling Fluid Preparation

This part of the project was undertaken to assess the environmental impact of drilling fluid waste on plant germination and growth beyond the 2-leaf stage of development.

Five different drilling fluids were prepared on a 18.50 barrel equivalent scale. The fluid were designed to have similar components and properties using five different internal phases.

The composition of fluids are listed below.
Oil used - Escaid 110 from Exxon USA
Density = 0.7939 g/ml
O/W Ratio 70:30

| Fluid # | 1 | 2 | 3 | 4 | 5 |
|---|---|---|---|---|---|
| salt used | $CaCl_2$ | KOAc | $Ca(OAc)_2$ | Na(OPr) | K/Ca—OAc |

-continued

The composition of fluids are listed below.
Oil used - Escaid 110 from Exxon USA
Density = 0.7939 g/ml
O/W Ratio 70:30

| | | | | | |
|---|---|---|---|---|---|
| conc (wt %) | 23% | 23% | 23% | 23% | 8%/15% |
| density | 1.2242 | 1.1370 | 1.1186 | 1.0999 | 1.1299 |
| volume exp. | 1.0851 | 1.1422 | 1.1257 | 1.1808 | 1.1495 |

All starting formulations contained:

| | | |
|---|---|---|
| VERSACOAT | 2.0 ppb | |
| VERSAMUL | 2.5 ppb | |
| Lime | 4.0 ppb | |
| VG-69 | 3.5 ppb | |
| VERSAMOD | 0.75 ppb | |
| Drill Solids | 30.00 ppb | 50:50 mixture of M-I GEL/Rev Dust |

| Mud no. | 1 | 2 | 3 | 4 | 5 |
|---|---|---|---|---|---|
| Oil(g) | 3,152.0 | 3,092,3 | 3,092.4 | 3,035.4 | 3,070.0 |
| Bar(g) | 1,662.7 | 1,848.4 | 1,949.4 | 1,912.6 | 1,853.6 |
| Brine(ml) | 1,847.5 | 1,907.9 | 1,879.4 | 1,934.9 | 1,905.3 |

$CaCl_2$ = Calcium chloride
KOAc = Potassium acetate
$Ca(OAc)_2$ = Calcium Acetate
NaOPr = Sodium propionate
K/Ca—OAc = Mixture of potassium & calcium acetate The drilling fluids were prepared by weighing the mineral oil out into 2 gallon buckets. Next, the VERSAMUL AND VERSACOAT were weighed into the bucket and the solution stirred on a dispersator mixer. After a homogeneous solution was obtained, the correct amount of VG-69 and lime were weighed and added to the stirring solution. The slurry was allowed to mix for 30 minutes. At this point the previously prepared internal phase was measured out by volume and added to the fluid. The dispersator speed was increased to a maximum level which still kept the components in the bucket. The drilling fluid was stirred 30 additional minutes, then the M-I BAR and drill solids were weighed and added. Finally, the VERSAMOD was added by dropper and measured by weight loss of the dropper/-container unit. The fluid was stirred another 30 minutes before being sealed and stored for treatment by the flow loop.

To better simulate a drilling fluid that had been circulated on a well, each fluid was then sheared on a flow loop. The flow is passed from approximately 6 liter reservoir through a pump and into steel pipe approximately ⅜–½" id. The fluid is heated in the pipe and then passed through a shear value at about 275° F. under approximately 800 psi. It then passed through a heat exchanger and cooling coils before being returned to the reservoir. Samples were collected every 45 minutes (2½ circulations and $P_{om}$ and rheology measured. Adjustments were made as needed to give a fluid having a 4–8 #/100 ft$^2$ yield point, at least a [5 lb/100 ft$^2$ yield point, at least a [5 lb/100 ft$^2$ 10 minute] gel and a $P_{om}$ of 0.5–0.9 mL $H_2SO_4$(0.1N). The additional additives are shown:

| Mud # | 1 | 2 | 3 | 4 | 5 |
|---|---|---|---|---|---|
| (ppb) VG-69 | 1.5 | 3.0 | 0 | 3.25 | 0 |
| (ppb) Lime | 0 | 2.75 | 0 | 1.5 | 0 |

Compulation of the above data gives the final formulations listed below. All fluids have a 70:30 oil:water ratio. Fluid properties were also taken and are below.

| Mud No. | 1 | 2 | 3 | 4 | 5 |
|---|---|---|---|---|---|
| Brine salt | $CaCl_2$ | $KO_2CCH_3$ | $Ca(O_2CCH_3)_2$ | $NaO_2CC_2H_5$ | $K_nCa_y[(O_2CCH_3)_{n+2y}]$ where y = 1.3 n |
| % Wt salt | 23% | 23% | 23% | 23% | 23% |
| Escaid 110 (bbl eq) | 0.613 | 0.599 | 0.602 | 0.590 | 0.597 |
| VERSACOAT (ppb) | 2.00 | 2.00 | 2.00 | 2.00 | 2.00 |
| VERSAMUL (ppb) | 2.50 | 2.50 | 2.50 | 2.50 | 2.50 |
| VG-69 (ppb) | 5.00 | 6.50 | 3.50 | 6.75 | 3.50 |
| Lime (ppb) | 4.00 | 6.75 | 4.00 | 5.50 | 4.00 |
| Brine (bbl eq) | 0.285 | 0.293 | 0.290 | 2.999 | 0.294 |
| Drill solids (ppb) | 30.00 | 30.00 | 30.00 | 30.00 | 30.00 |
| Bar (ppb) | 122.2 | 116.7 | 105.4 | 103.4 | 100.2 |
| VERSAMOD (ppb) | 0.75 | 0.75 | 0.75 | 0.75 | 0.75 |
| Properties: | | | | | |
| Mud Weight | 9.90 | 9.88 | 9.80 | 9.80 | 9.93 |
| 600 RPM | 28 | 25 | 27 | 35 | 29 |
| 300 RPM | 17 | 15 | 16 | 20 | 17 |
| 200 RPM | 13 | 12 | 12 | 16 | 14 |
| 100 RPM | 9 | 8 | 8 | 12 | 10 |
| 6 RPM | 5 | 5 | 5 | 7 | 5 |
| 3 RPM | 4 | 4 | 4 | 6 | 5 |
| PV (cps) | 11 | 10 | 11 | 15 | 12 |
| YP (lbs/100 ft$^2$) | 6 | 5 | 5 | 5 | 5 |
| 10"/10" gel | 5/6 | 6/8 | 5/7 | 7/10 | 5/8 |
| 10'/30' gel | 8/10 | 11/11 | 11/12 | 11/11 | 11/11 |
| ES (volts) | 415 | 361 | 438 | 345 | 420 |

-continued

| Mud No. | 1 | 2 | 3 | 4 | 5 |
|---|---|---|---|---|---|
| Pom (mL $H_2SO_4$) | 0.45 | 0.60 | 0.55 | 0.60 | 0.55 |
| $Cl^-$ (mg/L) | 53,500 | 100 | 100 | 100 | 100 |
| HTHP(300/500) | 11.4 | 20.8 | 12.8 | 22.8 | 24.4 |
| % $H_2O$ in filtrate | — | (3.2) | — | (2.8) | — |

Germination Tests

The seed tested was a sorghum grain. The procedure used was approved by the USAOSA. Each drilling fluid was run in quadruplicate. A sample of 1000 g of soil (obtained from Texas Dept. Agriculture) was placed in a plastic container. Then the drilling fluid was trickled over the top of soil in 3% by weight (30 g). It was then spooned into the soil and shaken until a homogeneous mixture was obtained. At this point the samples were turned over to the Seed Lab of the Texas Department of Agriculture. They then hand planted 100 seeds in each box. Thus 400 seeds were tested for each run. The containers were watered and the open containers were placed into a greenhouse. They were watered twice daily, once in the morning and once at night. The test was run for 28 total days. Results are shown below.

GERMINATION TEST RESULTS SORGHUM/GREENHOUSE
Drilling Fluids 3% wt Loading

| Sample No. | 5-3 | | | | 4-3 | | | | 3-3 | | | | 2-3 | | | | 1-3 | | | |
|---|---|---|---|---|---|---|---|---|---|---|---|---|---|---|---|---|---|---|---|---|
| Salt | $CaK(OAc)_3$ | | | | Na(OPr) | | | | $Ca(OAc)_2$ | | | | K(OAc) | | | | $CaCl_2$ | | | |
| | A | B | C | D | A | B | C | D | A | B | C | D | A | B | C | D | A | B | C | D |
| Total Germinated | 18 | 16 | 15 | 10 | 26 | 16 | 21 | 8 | 11 | 18 | 24 | 13 | 10 | 8 | 10 | 4 | 6 | 5 | 6 | 6 |
| Total Growth | 16 | 11 | 11 | 9 | 14 | 10 | 18 | 7 | 10 | 15 | 19 | 11 | 8 | 6 | 7 | 2 | 2 | 4 | 5 | 3 |
| Germ. but died | 2 | 5 | 4 | 1 | 12 | 6 | 3 | 1 | 1 | 3 | 5 | 2 | 2 | 2 | 3 | 2 | 4 | 1 | 1 | 3 |
| Dead Seed | 82 | 84 | 85 | 90 | 74 | 84 | 79 | 92 | 89 | 82 | 76 | 87 | 90 | 92 | 90 | 96 | 94 | 95 | 94 | 94 |
| Dormant Seed | 0 | 0 | 0 | 0 | 0 | 0 | 0 | 0 | 0 | 0 | 0 | 0 | 0 | 0 | 0 | 0 | 0 | 0 | 0 | 0 |
| % Germination (Best 3 avg) | 16.3 | | | | 21.0 | | | | 17.7 | | | | 9.3 | | | | 6.0 | | | |
| % Growth (Best 3 avg) | 12.7 | | | | 14.0 | | | | 14.7 | | | | 7.0 | | | | 4.0 | | | |

| Control: | A | B | C | D | | |
|---|---|---|---|---|---|---|
| Total Germ | 97 | 94 | 95 | 88 | % Germination | 95.3 |
| Total Growth | 97 | 94 | 95 | 88 | (Best 3 avg) | |
| Germ. but died | 0 | 0 | 0 | 0 | | |
| Dead Seed | 3 | 6 | 5 | 10 | % Growth | 95.3 |
| Abor/Dormant Seed | 0 | 0 | 0 | 2 | (Best 3 avg) | |

The Above results from the sorghum/greenhouse growth test show that the industry standard of $CaCl_2$ can be greatly improved upon. For these studies sodium proprionate and calcium acetate showed the best.

What is claimed is:

1. An improved oil-base drilling fluid, said drilling fluid being environmentally compatible with land disposal methods, comprising:
   (a) a continuous oil phase,
   (b) an internal phase, said internal phase comprising a solution of a non-halide compound dissolved in water, and
   (c) an emulsifier, said emulsifier being present in an amount effective to disperse said internal phase in said continuous phase.

2. The improved oil-base drilling fluid of claim 1 in which the non-halide compound dissolves in water and is selected from the group consisting of: acetates, propionates, tartrates, gluconates, citrates and combinations or salts thereof.

3. The improved oil-base drilling fluid of claim 1 in which the non-halide compound is selected from the group consisting of: potassium acetate, calcium acetate, sodium propionate or combinations thereof.

4. The improved oil-base drilling fluid of claim 3 in which said non-halide compounds are present in said internal phase at a concentration of from about 3.0 percent by weight to saturation.

5. The improved oil-base drilling fluid of claim 1 in which said oil-base continuous phase comprises less than about 1.0 percent by weight of aromatic hydrocarbons.

6. The improved oil-base drilling fluid of claim 1 wherein said oil-base continuous phase is present in a volume ratio to said internal phase of from about 1:2 to 20:1.

7. The improved oil-base drilling fluid of claim 1 in which said oil-base continuous phase comprises in major portion a petroleum oil selected from the group consisting of: diesel oil, mineral oil, kerosene, fuel oil, white oil, crude oil, and combinations thereof.

8. The improved oil-base drilling fluid of claim 1 in which the emulsifier is selected from the group consisting of: alkali and alkaline earth metal salts of fatty acids, rosin acids, tall oil acids, alkyl aromatic sulfonates, oxidized tall oils, carboxylated 2-alkyl imidazolines, imadazole salts, alkanolamides, alkyl amidoamines and combinations thereof.

9. An improved oil-base drilling fluid, said drilling fluid being environmentally compatible with land disposal methods, comprising:
   (a) an oil-base continuous phase comprising in major portion a petroleum oil selected from the group consisting of: diesel oil, mineral oil, kerosene, fuel oil, white oil, crude oil and combinations thereof;
   (b) a water-base internal phase, said internal phase comprising a solution of a non-halide compound dissolved in water, said non-halide compound being selected from the group consisting of: acetates, propionates, tartrates, gluconates, citrates and combinations or salts thereof; and (c) an emulsifier, said emulsifier being present in an amount effective to disperse said internal phase in said continuous phase.

10. The improved oil-base drilling fluid of claim 9 in which the non-halide compound is selected from the group consisting of: potassium acetate, calcium acetate, sodium propionate or combinations thereof.

11. The improved oil-base drilling fluid of claim 10 in which said non-halide compounds are present in the internal phase at a concentration ranging from about 3.0 percent by weight to saturation.

12. The improved oil-base drilling fluid of claim 9 in which the oil-base continuous phase comprises less than about 1.0 percent by weight of aromatic hydrocarbons.

13. The improved oil-base drilling fluid of claim 9 in which the oil-base continuous phase is present in a volume ratio to said internal phase of from 1:2 to 20:1.

14. The improved oil-base drilling fluid of claim 9 in which the emulsifier is selected from the group consisting of: alkali and alkaline earth metal salts of fatty acids, rosin acids, tall oil acids, alkyl aromatic sulfonates, oxidized tall oils, carboxylated 2-alkyl imidazolines, imadazole salts alkanolamides, alkyl amidoamines and combinations thereof.

15. An improved oil-base drilling fluid, said drilling fluid being environmentally compatible with land disposal, comprising:

(a) an oil-base continuous phase, said oil-base continuous phase comprising in major portion a petroleum oil selected from the group consisting of: diesel oil, mineral oil, kerosene, fuel oil, white oil, crude oil and combinations thereof;

(b) an internal phase dispersed in the continuous phase, said internal phase comprising an aqueous solution of a non-halide compound selected from the group consisting of: potassium acetate, calcium acetate, sodium propionate and combinations thereof, said non-halide compound being present in said internal phase at a concentration of from 3.0 percent to saturation, said oil-base continuous phase being present in a volume ratio of from 1:2 to 20:1 to said internal phase; and (c) an emulsifier, the emulsifier being present in an amount effective to disperse the internal phase in the continuous phase, said emulsifier being selected from the group consisting of alkali and alkaline earth metal salts of fatty acids, rosin acids, tall oil acids, alkyl aromatic sulfonates, oxidized tall oils, carboxylated 2-alkyl imidazolines, imadazole salts alkanolamides, alkyl amidoamines and combinations thereof.

* * * * *